United States Patent [19]

Spendel

[11] Patent Number: 5,540,105
[45] Date of Patent: Jul. 30, 1996

[54] FUNNEL INLET AND FUNNEL OUTLET FOR ULTRASONIC GAS METERS

[75] Inventor: Karl Spendel, Nuremberg, Germany

[73] Assignee: Siemens Aktiengesellschaft, Munich, Germany

[21] Appl. No.: 284,634

[22] PCT Filed: Feb. 10, 1993

[86] PCT No.: PCT/EP93/00324

§ 371 Date: Aug. 15, 1994

§ 102(e) Date: Aug. 15, 1994

[87] PCT Pub. No.: WO93/16357

PCT Pub. Date: Aug. 19, 1993

[51] Int. Cl.[6] .................................................. G01F 1/66
[52] U.S. Cl. .................................. 73/861.26; 73/861.27; 73/861.29
[58] Field of Search ...................... 73/861.23, 861.25, 73/861.26, 861.27, 861.28, 861.29, 861.31, 272, 272 A, 273, 195

[56] References Cited

U.S. PATENT DOCUMENTS

| 3,575,049 | 4/1971 | Boland | 73/861.29 |
|---|---|---|---|
| 3,788,140 | 1/1974 | Turtle | 73/861.28 |
| 4,011,753 | 3/1977 | Hausler | 73/861.28 |
| 4,365,518 | 12/1982 | Zacharias, Jr. | 73/861.31 |
| 4,480,486 | 11/1984 | Meisser et al. | 73/861.28 |
| 4,850,220 | 7/1989 | Asano et al. | 73/861.28 |
| 5,243,863 | 9/1993 | Gill | 73/861.28 |
| 5,325,726 | 7/1994 | Krieg et al. | 73/861.29 |

FOREIGN PATENT DOCUMENTS

| 0347096 | 12/1989 | European Pat. Off. . |
|---|---|---|
| 2369566 | 5/1978 | France . |
| 9201844 | 4/1992 | Germany . |
| 2205645 | 12/1988 | United Kingdom . |

*Primary Examiner*—Richard Chilcot
*Assistant Examiner*—Elizabeth L. Dougherty
*Attorney, Agent, or Firm*—Kenyon & Kenyon

[57] ABSTRACT

A space saving funnel inlet and funnel outlet is provided proceeding from the pipe connections of bellows gas meters with 90° flow deflection for ultrasonic gas flowmeters with a low pressure loss, high flow linearity and gas-independent calibration. This is achieved using a funnel inlet and funnel outlet for the 90° deflection of a gas flowing into and out of a measurement channel of a measurement pipe for an ultrasonic gas flowmeter, respectively. The walls forming the width of the measurement channel are spaced at a distance s from one another and are curved in a particular way in the region of the funnel inlet and funnel outlet (for example, horns curved away at right angles).

35 Claims, 1 Drawing Sheet

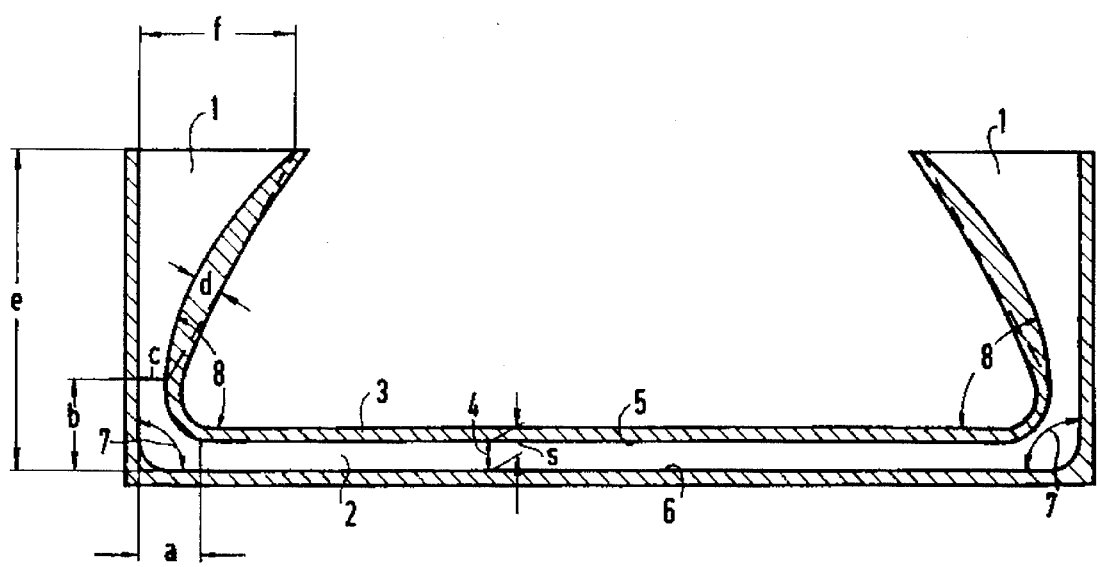

FUNNEL INLET AND FUNNEL OUTLET FOR ULTRASONIC GAS METERS

BACKGROUND OF THE INVENTION

The present invention relates to an inlet and outlet, preferably a funnel inlet and funnel outlet, at the ends of a measurement pipe provided with ultrasonic transducers, with a measurement channel for gas flow measurement, in which the inlet and outlet effect a deflection of the gas flowing into and out of the measurement channel, respectively.

In addition to the long-established bellows gas meters, ultrasonic gas flowmeters are also used for gas flow measurement. In the case of the use of ultrasonic gas flowmeters as gas meters, a problem arises that the connection to pipe connections pointing parallel upwards must be undertaken in accordance with a so-called U6 arrangement as a standard configuration. Furthermore, the space available for the installation of an ultrasonic gas flowmeter is limited, so that only measurement pipes of limited length can be used for the ultrasonic gas flow measurement. However, this restriction has an influence on the accuracy of measurement and is even further intensified if the length of the measurement pipe is additionally shortened on account of laterally fitted pipe connections for the inlet and outlet of the gas. Moreover, such a solution results in a distorted characteristic.

An inlet and outlet of the above-mentioned type is disclosed in Patent Document No. GB 2 205 645. In this type of inlet and outlet, the rate of flow of a liquid is measured, which liquid is conducted through a measurement pipe designed in a U-shape. The ends of the measurement pipe serve as an inlet and outlet and are angled off by 90° in relation to the region which functions as a measurement path. The cross section of the measurement pipe is equally large at all positions.

European Patent Application Number 0 347 096 reveals a measurement channel with ultrasonic transducers and a funnel-shaped inlet and outlet which are both disposed coaxially in relation to the measurement pipe. However, the two funnels do not effect any deflection of the gas flowing through the funnels.

SUMMARY OF THE INVENTION

The present invention provides a space-saving inlet and outlet with a flow deflection (for example, 90° flow defection) for ultrasonic gas flowmeters with low pressure loss, high flow linearity and gas-independent calibration. The inlet and outlet are preferably designed in a funnel shape. The funnel inlet and funnel outlet provide a deflection of a gas flowing into and out of a measurement channel of a measurement pipe for an ultrasonic gas flowmeter. An advantageous embodiment according to the present invention is achieved in that the walls forming the width of the measurement channel exhibit a spacing s from one another and are curved in the region of the funnel-shaped inlet and outlet, forming an outer angle and an inner angle, where the outer angle is preferably in a range of 80° to 100°. Further advantageous refinements of the funnel inlet and funnel outlet are described below.

BRIEF DESCRIPTION OF THE DRAWING

The drawing illustrates a funnel inlet and funnel outlet according to an embodiment of the present invention.

DETAILED DESCRIPTION

An illustrative embodiment of a funnel inlet and funnel outlet according to an embodiment of the present invention is shown in the drawing. The figure shows a funnel inlet and funnel outlet at the ends of a measurement pipe 3 in the form of horns 1 curved away at right angles. The gas respectively flows through these horns 1 into the measurement channel 2 of the measurement pipe 3 or out of the measurement channel 2. A measurement path is situated within the rectilinear region of the measurement channel 2. Ultrasonic transducers for the measurement (not shown in the drawing) are disposed at the ends of the measurement path. The width 4 of the measurement channel 2 is s. The design of the horns is related hereinbelow to this width dimension s. The measurement channel 2 is bounded in its width by the opposite channel walls 5, 6, which are curved away in the end region to form the horns 1. In this case, an outer angle 7 is formed proceeding from the channel wall 6 and an inner angle 8 is formed proceeding from the channel wall 5. In the embodiment illustrated in the drawing, the outer angle 7 is 90°. However, outer angle 7 may be equal to other values. For example, one preferred range of values for outer angle 7 is a range of 80° to 100°. The limb of the outer angle 7, which is angled off in relation to the limb formed by the measurement channel 2, exhibits a length of 10 s.

The curvature of the channel wall forming the inner angle 8 lies within a spacing a from the curved-away limb of the channel wall 6 forming the outer angle 7. In the present embodiment illustrated in the drawing, a is approximately 2 s. However, other values of a may be implemented according to embodiments of the present invention. For example, one preferred range of values of a according to an embodiment of the present invention is 1.6 s to 2.4 s.

The funnel inlet and funnel outlet 1 begin to broaden out at the spacing b from the limb of the outer angle 7 which is formed by the measurement channel 2. The spacing b is approximately 3 s in the embodiment illustrated in the drawing. However, other values of b may be implemented according to other embodiments of the present invention. For example, one preferred range of values for b according to an embodiment of the present invention is 2.4 s to 3 s.

The width c of the funnel inlet and funnel outlet 1 at the position of the broadening out is about equal to the width s of the measurement channel in the illustrated embodiment. However, other values of c may be implemented according to other embodiments of the present invention. For example, one preferred range of values of c according to an embodiment of the present invention is 0.8 s to 1.2 s.

The limb of the inner angle 8, which is angled off in relation to the limb formed by the measurement channel 2, extends linearly apart from an in-turned portion d approximately equal in size to width dimension s. However, other values of d may be implemented according to embodiments of the present invention. For example, one preferred range of values of d according to an embodiment of the present invention is 0 (or 0s) to 1.2 s.

The limb of the outer angle 7 which is angled off in relation to the limb 6 formed by the measurement channel 2 exhibits a length of approximately 10 s. However, other values of e may be implemented according to embodiments of the present invention. For example, one preferred range of values of e according to an embodiment of the present invention is 8 s to 12 s.

The end width f of the opening at the funnel inlet and the opening at the funnel outlet 1 is about equal to 5 times the width s of the measurement channel 2. However, other values of f may be implemented according to embodiments of the present invention. For example, one preferred range of values of f according to an embodiment of the present invention is 4 s to 6 s.

In the case of the installation of the measurement pipe 2 in a housing as a connecting element between two separate, relatively large-volume chambers, the flowing gas is subject to a great change of velocity. The horn construction according to the present invention deflects the gas with a gentle transition through 90° and attends to the necessary velocity transformation between the buffer volume established by the chambers and the measurement channel. The horn broadens out from the rectangular channel cross section with a height of about 30 mm and a width of 6 mm towards the center of the pipe to reach a square cross section having a side length of 30 min. An approximately exponential curvature in the progression of the broadening of the horn as shown in the figure has proved to be particularly favorable for the purpose of satisfying the above requirements.

I claim:

1. An inlet and outlet at ends of a straight measurement pipe having a measurement channel for gas flow measurement, wherein the inlet and outlet provide a deflection of gas flowing into and out of the measurement channel, respectively, both said inlet and outlet being designed in a funnel shape such that the inlet and outlet each have a opening which is wider than the width of the measuring channel, wherein the walls forming the width of the measurement channel have a spacing s from one another and are curved in a region of the funnel shaped inlet and outlet to form an outer angle and an inner angle, said inner angle being in a range of 80 to 100 and wherein an end width f of said openings at the inlet and outlet are in a range of 4 s to 6 s.

2. The inlet and outlet as claimed in claim 1, wherein a curvature of a channel wall forming an inner angle lies within a spacing a from a curved-away limb of a channel wall forming an outer angle, wherein the spacing a is in a range of 1.6 s to 2.4 s, wherein s is the width of the measurement channel.

3. The inlet and outlet as claimed in claim 1, wherein a broadening of the inlet and outlet begins at a spacing b in a range of 2.4 s to 3 s along a limb of an outer wall from an outer angle which is formed by the measurement channel, and wherein a width c of the inlet and outlet at this position is in a range of 0.8 s to 1.2 s, wherein s is the width of the measurement channel.

4. The inlet and outlet as claimed in claim 1, wherein a limb of a wall forming an inner angle, which is angled off in relation to a limb formed by the measurement channel, extends linearly apart from an in-turned portion d which is in a range of 0 to 1.2 s, wherein s is the width of the measurement channel.

5. The inlet and outlet as claimed in claim 1, wherein a limb of a wall forming an outer angle which is angled off in relation to a limb formed by the measurement channel exhibits a length e in a range of 8 s to 12 s, wherein s is the width of the measurement channel.

6. The inlet and outlet as claimed in claim 1, wherein an end width f of an opening at the inlet and outlet is in a range of 4 s to 6 s, wherein s is the width of the measurement channel.

7. An inlet and outlet as claimed in claim 1, wherein ultrasonic transducers are provided at ends of a measurement path within a region of the measurement channel.

8. An inlet and outlet as claimed in claim 1, wherein the deflection of gas is approximately a 90° deflection.

9. An inlet and outlet as claimed in claim 1, wherein the measurement channel of the measurement pipe is for an ultrasonic gas flowmeter.

10. The inlet and outlet as claimed in claim 1, wherein the curvature of the channel wall forming the inner angle lies within a spacing a from the curved-away limb of the channel wall forming the outer angle, wherein spacing a is in a range of 1.6 s to 2.4 s.

11. The inlet and outlet as claimed in claim 1, wherein a broadening of the inlet and outlet begins at a spacing b in a range of 2.4 s to 3 s along a limb from the outer angle which is formed by the measurement channel, and the width c of the inlet and outlet at this position is in a range of 0.8 s to 1.2 s.

12. The inlet and outlet as claimed in claim 1, wherein a limb of a wall forming the inner angle, which is angled off in relation to a limb formed by the measurement channel, extends linearly apart from an in-turned portion d which is in a range of 0 to 1.2 s.

13. The inlet and outlet as claimed in claim 1, wherein a limb of a wall forming the outer angle, which is angled off in relation to a limb formed by the measurement channel, exhibits a length e in a range of 8 s to 12 s.

14. An inlet and outlet as claimed in claim 1, wherein ultransonic transducers are provided at ends of a measurement path within a region of the measurement channel.

15. An inlet and outlet as claimed in claim 1, wherein the deflection of gas is approximately a 90° deflection.

16. An inlet and outlet as claimed in claim 1, wherein the measurement channel of the measurement pipe is for an ultrasonic gas flowmeter.

17. The inlet and outlet as claimed in claim 1, wherein s is the width of the measurement channel, wherein a curvature of a channel wall forming an inner angle lies within a spacing a from a curved-away limb of a channel wall forming an outer angle, wherein the spacing a is in a range of 1.6 s to 2.4 s, wherein a broadening of the inlet and outlet begins at a spacing b in a range of 2.4 s to 3 s along a limb of a wall forming an outer angle which is formed by the measurement channel, and wherein a width c of the inlet and outlet at this position is in a range of 0.8 s to 1.2 s, wherein a limb of a wall forming an inner angle, which is angled off in relation to a limb formed by the measurement channel, extends linearly apart from an in-turned portion d which is in a range of 0 to 1.2 s, wherein a limb of a wall forming an outer angle which is angled off in relation to a limb formed by the measurement channel exhibits a length e in a range of 8 s to 12 s, and wherein an end width f of an opening at the inlet and outlet is in a range of 4 s to 6 s.

18. The inlet and outlet as claimed in claim 1, wherein the curvature of the channel wall forming the inner angle lies within a spacing a from the curved-away limb of the channel wall forming the outer angle, wherein spacing a is in a range of 1.6 s to 2.4 s, wherein a broadening of the inlet and outlet begins at a spacing b in a range of 2.4 s to 3 s from the limb of the outer angle which is formed by the measurement channel, and the width c of the inlet and outlet at this position is in a range of 0.8 s to 1.2 s, wherein a limb of the inner angle, which is angled off in relation to a limb formed by the measurement channel, extends linearly apart from an in-turned portion d which is in a range of 0 to 1.2 s, wherein a limb of the outer angle, which is angled off in relation to limb formed by the measurement channel, exhibits a length e in a range of 8 s to 12 s, and wherein an end width f of an opening at the inlet and outlet is in a range of 4 s to 6 s.

19. An ultrasonic gas flowmeter comprising:

a straight measurement pipe, said measurement pipe having an elongated region, said elongated region including transducer; and an inlet and an outlet at ends of said elongated region of said straight measurement pipe to generate a U-shaped channel for a gas flow, said inlet and outlet each being funnel-shaped and each having a first wall, said first walls facing each other and being bowed towards each other, and said inlet and outlet each having an end opening which is wider than an internal width s of said elongated region of said measurement pipe.

20. The ultrasonic gas flowmeter as claimed as claim 19, wherein said elongated region has an outer wall, wherein said inlet and outlet each has a second wall opposite to said respective first wall, said second walls being straight such that said second walls and said outer wall of said elongated region form an outer U-shaped curvature.

21. The ultrasonic gas flowmeter as claimed in claim 20, wherein each of said second walls forms an outer angle in the range of 80° to 100° with said outer wall of said elongated region.

22. The ultrasonic gas flowmeter as claimed in claim 20, wherein said elongated region has an inner wall opposite to said outer wall, wherein said inner wall at each of its ends extends to said first walls via a curved inner wall, respectively, and wherein said curved wall is arranged within a spacing a in the range of 1.6 s to 2.4 s from an inner side of said second wall.

23. The ultrasonic gas flowmeter as claimed in claim 20, wherein said outer wall at each of its ends extends to said second walls via a curved outer wall, respectively, thereby forming a 90° deflection with a gentle transition of a gas flow when flowing through said channel.

24. The ultrasonic gas flowmeter as claimed in claim 20, wherein said funnel-shaped inlet and outlet each have a beginning of its broadening out within a spacing b in the range of 2.4 s to 3 s from the inner side of said outer wall.

25. The ultrasonic gas flowmeter as claimed in claim 19, wherein said inlet and outlet each have a beginning of its broadening out, wherein said channel has a width c in the range of 0.8 s to 1.2 s at the position of the beginning of said broadening out.

26. The ultrasonic gas flowmeter as claimed in claim 20, wherein said first walls each has an inner side being bowed by a portion d towards said respective second wall, wherein the portion d is in the range of 0 s to 12 s.

27. The ultrasonic gas flowmeter as claimed in claim 20, wherein said second walls have a length e in the range of 8 s to 12 s.

28. The ultrasonic gas flowmeter as claimed in claim 21, wherein said elongated region has an inner wall opposite to said outer wall, wherein said inner wall at each of its ends extends to said first walls via a curved inner wall, respectively, wherein said curved wall is arranged within a spacing a in the range of 1.6 s to 2.4 s from an inner side of said second wall.

29. The ultrasonic gas flowmeter as claimed in claim 21, wherein said outer wall at each of its ends extends to said second walls via a curved outer wall, respectively, thereby forming a 90° deflection with a gentle transition of a gas flow when flowing through said channel.

30. The ultrasonic gas flowmeter as claimed in claim 21, wherein said funnel-shaped inlet and outlet each have a beginning of its broadening out within a spacing b in the range of 2.4 s to 3 s from the inner side of said outer wall.

31. The ultrasonic gas flowmeter as claimed in claim 28, wherein said outer wall at each of its ends extends to said second walls via a curved outer wall, respectively, thereby forming a 90° deflection with a gentle transition of a gas flow when flowing through said channel.

32. The ultrasonic gas flowmeter as claimed in claim 31, wherein said funnel-shaped inlet and outlet each have a beginning of its broadening out within a spacing b in the range of 2.4 s to 3 s from the inner side of said outer wall.

33. The ultrasonic gas flowmeter as claimed in claim 32, wherein said inlet and outlet each having a beginning of its broadening out, wherein said channel has a width c in the range of 0.8 s to 1.2 s at the position of the beginning of said broadening out.

34. The ultrasonic gas flowmeter as claimed in claim 33, wherein said first walls each has an inner side being bowed by a portion d towards said respective second wall, wherein the portion d is in the range of 0 s to 12 s.

35. The ultrasonic gas flowmeter as claimed in claim 34, wherein said second walls have a length e in the range of 8 s to 12 s.

* * * * *